(12) United States Patent
Shinriki et al.

(10) Patent No.: US 7,302,572 B2
(45) Date of Patent: Nov. 27, 2007

(54) PORTABLE INFORMATION STORAGE MEDIUM AND ITS AUTHENTICATION METHOD

(75) Inventors: Tetsuo Shinriki, Tokyo (JP); Kazuyoshi Irisawa, Tokyo (JP); Naoto Shibata, Tokyo (JP)

(73) Assignee: Dai Nippon Printing Co., Ltd, Tokyo (JP)

( * ) Notice: Subject to any disclaimer, the term of this patent is extended or adjusted under 35 U.S.C. 154(b) by 709 days.

(21) Appl. No.: 10/343,888

(22) PCT Filed: Mar. 12, 2002

(86) PCT No.: PCT/JP02/02316

§ 371 (c)(1),
(2), (4) Date: Feb. 5, 2003

(87) PCT Pub. No.: WO02/078248

PCT Pub. Date: Oct. 3, 2002

(65) Prior Publication Data

US 2004/0037121 A1 Feb. 26, 2004

(30) Foreign Application Priority Data

Mar. 22, 2001 (JP) .............................. 2001-82054

(51) Int. Cl.
*H04L 9/00* (2006.01)
(52) U.S. Cl. ...................... 713/172; 713/167; 713/168; 713/171; 713/189; 713/193; 713/194; 380/1; 380/44; 380/46; 380/277
(58) Field of Classification Search ................ 713/168, 713/172, 167, 171, 189, 193, 194; 380/1, 380/44, 46, 277
See application file for complete search history.

(56) References Cited

U.S. PATENT DOCUMENTS

| 5,288,978 | A | * | 2/1994 | Iijima | 235/380 |
| 5,371,796 | A | * | 12/1994 | Avarne | 713/170 |
| 5,495,098 | A | * | 2/1996 | Pailles et al. | 235/492 |
| 5,907,832 | A | * | 5/1999 | Pieterse et al. | 705/39 |
| 5,991,412 | A | * | 11/1999 | Wissenburgh et al. | 705/67 |
| 6,381,699 | B2 | * | 4/2002 | Kocher et al. | 713/172 |
| 6,532,290 | B1 | * | 3/2003 | Dent | 380/247 |

FOREIGN PATENT DOCUMENTS

| EP | 1022683 | 12/1999 |
| JP | 10303886 | 11/1998 |
| JP | 11187015 | 7/1999 |
| JP | 305453 | 11/2000 |
| JP | 230771 | 8/2001 |
| WO | 9501686 | 1/1995 |

OTHER PUBLICATIONS

Kocher, P. et al., Differential Power Analysis. Lecture Notes in Computer Science. vol. 1666, 1999.08, pp. 388 to 397, Especially 6 Preventing DPA

* cited by examiner

*Primary Examiner*—Kim Vu
*Assistant Examiner*—Beemnet W Dada
(74) *Attorney, Agent, or Firm*—Ladas & Parry (57) ABSTRACT

Authentification data (R) comprising random numbers generated by a reader/writer (200) is given to an IC card (100), encrypted by utilizing a secret key (a), and returned as encryption data (C). This encryption data (C) is decoded by utilizing an open key (β) to authentify the IC card. A set of past given authentification data (R) is stored in an authentification data storage section (130): if another set of given authentification data (R) is the same as the set of past data, an encryption operating section (150) is prevented from executing an illegal statistical analysis technique by repeatedly giving encrypting operation the same set of authentiification data (R).

6 Claims, 4 Drawing Sheets

PORTABLE INFORMATION STORAGE MEDIUM AND ITS AUTHENTICATION METHOD

TECHNICAL FIELD

The present invention relates to a portable information recording medium and an authentication method for the same and, more specifically, an authentication method for authenticating validity of an IC card when accessing the IC card from external equipment and an IC card which is suitable for such an authentication method.

BACKGROUND ART

A portable information recording medium typified by an IC card has rapidly spread in conjunction with downsizing of technology, and it is only a matter of time before IC cards become prevalent on an individual general user basis one by one. Thus, as portable information recording media such as IC cards have increasingly come to be used as a tool that is essential in social life, security comes into important question. To access an IC card, a so-called reader/writer device is used, and a computer system carries out an exchange of data with the inside of the IC card via this reader/writer device. Normally, when an IC card is inserted into a reader/writer device, processing is executed for authenticating each other.

Authentication of an IC card from a reader/writer device is normally made according to a method in which arbitrary authentication data (using random numbers) is provided from the reader/writer device to the IC card together with an authentication command, and it is verified whether or not the IC card makes a correct response. Concretely, a public key cryptosystem is used, and a secret key $\alpha$ is stored inside an authentic IC card in advance, authentication data (arbitrary random numbers) provided in the reader/writer device is encoded by using this secret key $\alpha$, and encoded data thus obtained is fed-back as a response. Then, the reader/writer device decodes this encoded data that has been fed-back as a response, and authenticates the IC card based on a judgment whether or not data obtained through this decoding process agrees with the original authentication data.

The secret key $\alpha$ stored in the IC card is normally structured so as not to be externally read out by any method, so that it is very difficult to imitate an IC card having a correct secret key $\alpha$. Therefore, according to the above-mentioned method, if data that is obtained by decoding the encoded data fed-back as a response agrees with the original authentication data, it is authenticated that an IC card is not fake.

As mentioned above, logically, a secret key a stored in an IC card is prevented from being externally read out by any method. However, in reality, there is a method for externally detecting a secret key $\alpha$ stored in an IC card in a nondestructive manner by analyzing physical phenomena (for example, electric power consumption) in operation of the IC card. For example, a method called DPA (Differential Power Analysis) is based on a principle in which, by statistically analyzing a waveform of electric power consumption of an IC card, the contents of a secret key $\alpha$ are estimated. Concretely, in a condition where a measuring system for measuring electric current consumption inside an IC card is connected to a power supply terminal, etc., of the IC card, predetermined authentication data is repeatedly sent from a reader/writer device, an encoding operation using a secret key $\alpha$ is executed inside the IC card, and a power consumption waveform at this point is analyzed, whereby the contents of the secret key $\alpha$ are statistically detected.

An object of the present invention is, therefore, to provide an authentication method for a portable information recording medium, by which reliable security against illegal analyzing methods as mentioned above can be secured.

DISCLOSURE OF THE INVENTION (1) The first feature of the present invention resides in an authentication method for authenticating a portable information recording medium as valid when external equipment accesses the portable information recording medium, comprising:

an operation defining step for determining a first key $\alpha$, a second key $\beta$, an encoding operation, and a decoding operation so that encoded data C is obtained by executing the encoding operation using the first key $\alpha$ for arbitrary authentication data R and data identical to the authentication data R is obtained by executing the decoding operation using the second key $\beta$;

a medium preparing step in which the first key $\alpha$ is stored in the portable information recording medium, and a processing function for executing the encoding operation is prepared for the portable information recording medium;

random number transmitting step in which the external equipment generates a random number or numbers, and the random number or numbers are transmitted to the portable information recording medium as authentication data R;

an authentication data storing step in which the transmitted authentication data R is received and stored in a predetermined storing location inside the portable information recording medium;

a judging step in which it is investigated whether or not a newly transmitted authentication data R agrees with previously stored authentication data R in the portable information recording medium, and when it is determined that the newly transmitted authentication data R disagrees with any of the previously stored authentication data R, it is judged that encoding is permitted;

an encoding step in which, when encoding is permitted in the judging step, the encoding operation using the first key $\alpha$ is executed for the transmitted authentication data R, and resulted encoded data C is returned to the external equipment;

a decoding step in which the decoding operation using the second key $\beta$ is executed in the external equipment for the encoded data C that has been returned from the portable information recording medium; and an authenticating step in which, when data identical to the authentication data R transmitted in the random number transmitting step is obtained as a result of the decoding operation, the portable information recording medium is authenticated as valid.

(2) The second feature of the present invention resides in the authentication method for authenticating a portable information recording medium according to the first feature, wherein:

prior to the authentication data storing step, the judging step is carried out for the authentication data R that has been transmitted in the random number transmitting step, and only when encoding is permitted in the judging step, the authentication data storing step is carried out.

(3) The third feature of the present invention resides in the authentication method for authenticating a portable information recording medium according to the first or second feature, wherein:

a plural number n of storing locations at which authentication data R can be stored are prepared in the portable information recording medium, and only the latest n pieces of authentication data R are stored in the authentication data storing step.

(4) The fourth feature of the present invention resides in a portable information recording medium having a function for executing a predetermined encoding operation for authentication data R when the authentication data R has been transmitted together with an authentication command from external equipment and returning encoded data C resulting from the encoding operation to the external equipment as a response, comprising:

a command receiving part for receiving commands transmitted from the external equipment;

an authentication data storing part for storing the authentication data R;

a secret key storing part for storing a secret key α to be used for the encoding operation;

a disagreement confirming part for confirming disagreement between authentication data R that has been stored in the authentication data storing part and newly received authentication data R when the command receiving part has received the newly received authentication data R together with an authentication command;

an authentication data writing part for writing the newly received authentication data R that the command receiving part has received into the authentication data storing part;

an encoding operation part for obtaining encoded data C by executing an encoding operation for the newly received authentication data R by using the secret key α stored in the secret key storing part on condition that disagreement has been confirmed at the disagreement confirming part; and a response transmitting part for transmitting a response including the encoded data C to the external equipment.

(5) The fifth feature of the present invention resides in the portable information recording medium according to the fourth feature, wherein:

writing of the newly received authentication data R is carried out at the authentication data writing part on condition that disagreement has been confirmed by the disagreement confirming part.

(6) The sixth feature of the present invention resides in the portable information recording medium according to the fourth or fifth feature, wherein:

a plural number n of storing locations are prepared in the authentication data storing part so that a plural number n of pieces of authentication data R can be stored; and the authentication data writing part executes processing for writing target authentication data R into respective storing locations, and when all of the plural number n of storing locations are occupied, rewrite processing is applied to a storing location at which the oldest authentication data R has been written.

BEST MODE FOR CARRYING OUT THE INVENTION

Hereinafter, the present invention will be described with reference to the accompanying drawings. First, with reference to the block diagram of FIG. 1, the basic principle of an authentication method that has been conventionally carried out in a general portable information recording medium (more specifically, an IC card) is described. In this authentication method, a public key cryptosystem using a paired key composed of a secret key and a public key is employed.

Figure 1:
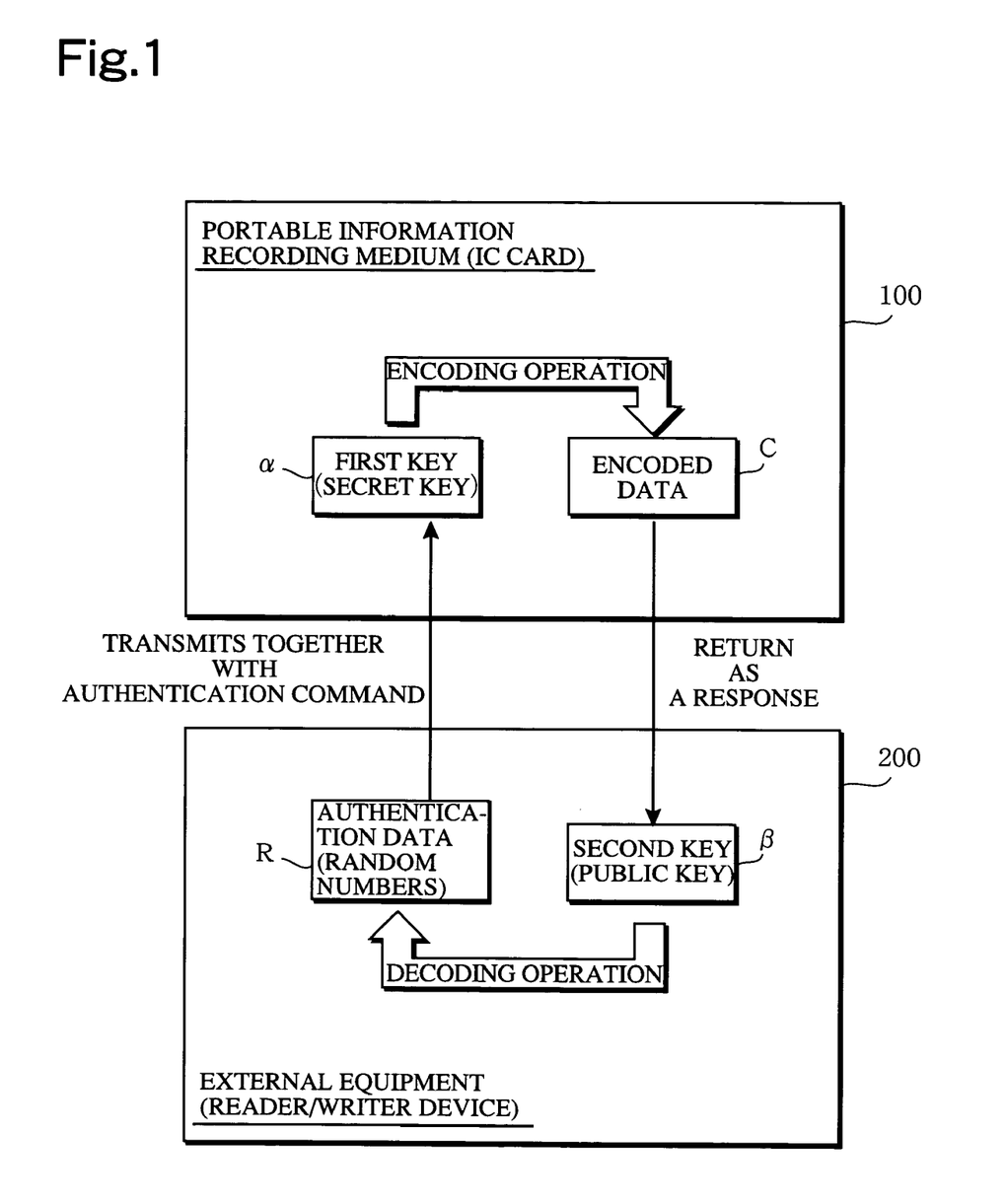
FIG. 1 is a block diagram showing general procedures for authenticating a portable information recording medium (IC card) 100 from external equipment (reader/writer device) 200 in a condition where the IC card 100 and the reader/writer device 200 are electrically connected to each other upon inserting the IC card 100 into the reader/writer device 200.

FIG. 1 is a block diagram showing general procedures for authenticating a portable information recording medium (IC card) 100 from external equipment (reader/writer device) 200 in a condition where the IC card 100 and the reader/writer device 200 are electrically connected to each other by inserting the IC card 100 into the reader/writer device 200. In this illustrated example, a first key α (secret key) is stored in advance in the IC card 100, and a second key β (public key) is stored in advance in the reader/writer device 200. Herein, the first key α is a key unique to a holder who holds this IC card 100, which is a secret key that has not been made public. On the other hand, the second key β is a key that has been made public although the key is unique to the holder. Therefore, it is not necessary to always store the second key β in the reader/writer device 200, and the second key β may read from other locations (for example, a host computer) as necessary. The IC card 100 is provided with a function for encoding arbitrary data by using the first key α, and the reader/writer device 200 is provided with a function for decoding the encoded data by using the second key β.

Furthermore, the reader/writer device 200 is provided with a function for generating random numbers, and random numbers generated by the reader/writer device 200 are transmitted to the IC card 100 as authentication data R together with an authentication command. The IC card 100 executes an encoding operation for the authentication data R thus transmitted by using the first key α, whereby encoded data C is generated. The encoded data C is uniquely determined based on the authentication data R on condition that the first key α is used. The IC card 100 returns the encoded data C thus obtained to the reader/writer device 200 as a response to the authentication command. The reader/writer device 200 executes a decoding operation for the encoded data C thus transmitted by using the second key β. If data obtained by this decoding operation agrees with the original authentication data R, the IC card 100 is authenticated as valid.

Needless to say, it is necessary to specify the first key α, the second key β, an encoding operation, and a decoding operation in advance in order to make such an authentication method available. Namely, it is necessary to determine the first key α, the second key β, the encoding operation, and the decoding operation in advance so that an encoded data C is obtained by executing the encoding operation using the first key α for an arbitrary authentication data R, and a data identical to the authentication data R is obtained by executing the decoding operation using the second key β for the decoded data C. In other words, the first key α and the second key β need to compose a paired key corresponding to a secret key and a public key in a public key cryptosystem, and an encoding operation to be executed at the IC card 100 and a decoding operation to be executed at the reader/writer device 200 need to correspond to an encoding operation and a decoding operation in this public key cryptosystem.

Since random numbers are used for authentication data R to be generated at the reader/writer device 200, the contents of authentication data to be provided for the IC card 100 differs each time. Therefore, the contents of the encoded data C that is returned from the IC card 100 as a response also differs each time. However, as long as the IC card 100 executes a correct encoding operation by using a correct secret key α, by executing a correct decoding operation at the reader/writer device 200 by using a correct public key β, decoded data agrees with the original authentication data R. Therefore, regardless of numbers used in the original authentication data R, authentication for the IC card 100 is possible. Furthermore, logically, since the secret key α stored in the IC card 100 is never externally read out, it appears that sufficient security is secured.

However, in actuality, as aforementioned, a method for statistically analyzing electric current consumption of an IC card is used, it becomes possible to externally detect the contents of the secret key α stored in the IC card 100. For example, when authentication data R of "11111111" is repeatedly provided for the IC card 100 and a waveform of electric current consumption at this point inside the IC card 100 is repeatedly measured, a certain pattern is statistically obtained. Likewise, when authentication data R of "00000000" is repeatedly provided for the IC card 100 and a waveform of electric current consumption inside the IC card 100 at this point is repeatedly measured by an electric measuring method, a certain pattern is also statistically obtained. By analyzing such a pattern, the contents of the secret key α stored inside can be estimated by analogy.

In order to nullify such an illegal analyzing method, according to the invention, an encoding operation inside the IC card 100 is rejected when identical authentication data R is repeatedly provided for the IC card 100. For example, in the above-mentioned example, on the assumption that authentication data R of "11111111" is provided in a first authentication command, an encoding operation using the secret key α is executed in response to this first authentication command, and encoded data C thus obtained is returned as a response, and if identical authentication data R of "11111111" is provided in the second and following authentication commands, the authentication commands are rejected, and an encoding operation using the secret key α is not executed. Of course, a normal response cannot also be obtained.

With such a mechanism, since it becomes impossible to repeatedly execute an encoding operation using identical authentication data R, it becomes difficult to analyze the waveform of electric current consumption according to a statistical method.

Figure 2:
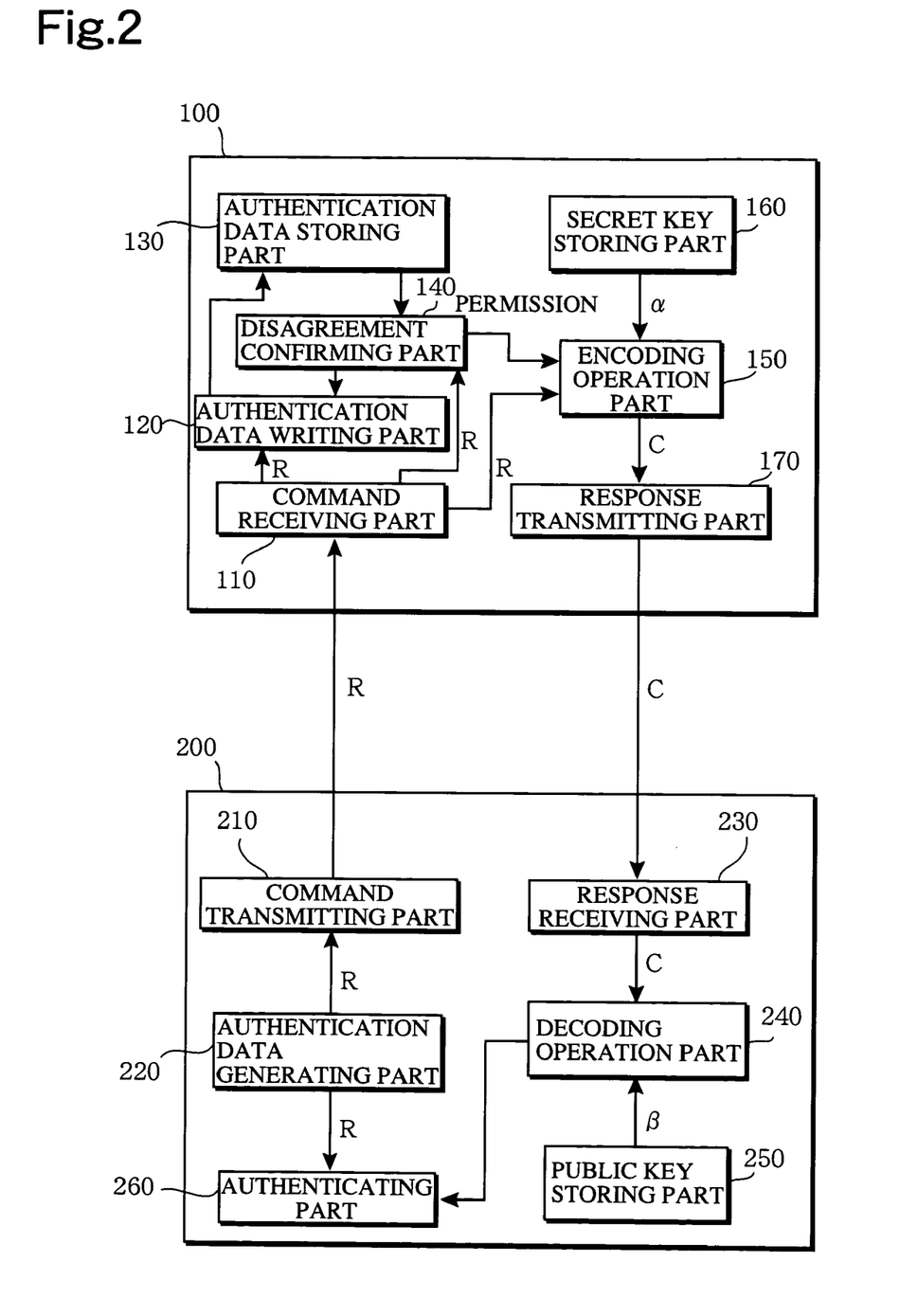
FIG. 2 is a block diagram showing components of a portable information recording medium (IC card) 100 of the invention and external equipment (reader/writer device) 200 in a condition where the IC card 100 is connected to the reader/writer device 200.

In order to achieve this object, an IC card 100 may be constructed as shown in the block diagram of FIG. 2. This block diagram of FIG. 2 shows a condition where an IC card 100 (portable information recording medium) relating to the invention is connected to a conventional general reader/writer device 200 (external equipment). As shown in the figure, the IC card 100 relating to the present embodiment comprises command receiving part 110, authentication data writing part 120, authentication data storing part 130, disagreement confirming part 140, encoding operation part 150, secret key storing part 160, and response transmitting part 170. On the other hand, the reader/writer device 200 comprises command transmitting part 210, authentication data generating part 220, response receiving part 230, decoding operation part 240, public key storing part 250, and authenticating part 260. Of course, those shown in FIG. 2 are only components that are necessary for executing authentication processing of the invention, so that an actual IC card and an actual reader/writer device are provided with other components for executing their original functions as an IC card and a reader/writer device.

The reader/writer device 200 shown in FIG. 2 is a conventional general reader/writer device. Namely, a conventional reader writer device can be used as it is for carrying out the invention. The authentication data generating part 220 is, in actuality, means for generating random numbers, and random numbers generated herein are provided for the IC card 100 as authentication data R. That is, the authentication data R generated as random numbers is transmitted from the command transmitting part 210 to the command receiving part 110 together with an authentication command. The IC card 100 is a portable information recording medium having a function for applying a predetermined encoding operation to authentication data R when the authentication data R has been transmitted together with an authentication command as mentioned above and for returning encoded data C that results from the encoding operation as a response, wherein encoded data C as a response is transmitted from the response transmitting part 170 to the response receiving part 230.

The reader/writer device 200 applies a decoding operation to the encoded data C that has been thus returned. That is, by using the public key β stored in the public key storing part 250, a decoding operation is executed for the encoded data C at the decoding operation part 240. Decoded data that results from this operation is compared at the authenticating part 260 with the original authentication data R generated by the authentication data generating part 220, and when they agree with each other, the IC card 100 is authenticated as valid in the same manner as aforementioned.

On the other hand, processing of an encoding operation to be executed at the IC card 100 is also basically the same as aforementioned. That is, authentication data R received in the command receiving part 110 is provided for the encoding operation part 150 and encoded. The secret key storing part 160 stores a secret key α. The encoding operation part 150 reads-out the secret key α from this key storing part 160, and executes an encoding operation for the authentication data R and executes processing for determining encoded data C by using this secret key α. Determined encoded data C is transmitted as a response from the response transmitting part 170.

However, when the encoding operation part 150 executes this encoding operation, permission of the disagreement confirming part 140 is required. In other words, even if authentication data R is provided for the command receiving part 110, unless a signal indicating permission for an encoding operation of this authentication data R is provided from the disagreement confirming part 140, the encoding operation part 150 does not execute an encoding operation. The disagreement confirming part 140 judges whether or not the authentication data R newly provided for the command receiving part 110 agrees with previously provided authentication data R, and only in the case of disagreement, a signal indicating permission for an encoding operation is provided for the encoding operation part 150. For such a judgment at the disagreement confirming part 140, it is necessary to accumulate and store authentication data that has been provided heretofore. Such accumulation processing is executed by the authentication data writing part 120 and the authentication data storing part 130. The authentication data storing part 130 has storage locations for accumulating and storing a plurality of pieces of authentication data R that have been provided heretofore, and the authentication data writing part 120 executes processing for successively writing authentication data R that the command receiving part 110 has received into the authentication data storing part 130.

Of course, when this IC card 100 is initially used, authentication data R has not been accumulated in the authentication data storing part 130, however, each time authentication data R is transmitted together with an authentication command from the command transmitting part 210, the authentication data R is written into the authentication data storing part 130 by the authentication data writing part 120. When the command receiving part 110 has received authentication data R together with an authentication command, the disagreement confirming part 140 confirms disagreement between the authentication data R that has or have been stored in the authentication data storing part 130 and newly received authentication data R, and provides a signal indicating permission for an encoding operation for the encoding operation part 150. The encoding operation part 150 executes an operation for obtaining encoded data C by executing an encoding operation for the newly received authentication data R by use of the secret key α that has been stored in the secret key storing part 160 on condition that disagreement has been confirmed at this disagreement confirming part 140.

In this embodiment, the authentication data writing part 120 writes newly received authentication data R on condition that disagreement confirming part 140 has confirmed disagreement of the newly received authentication data R. Namely, when the command receiving part 110 has received new authentication data R together with an authentication command, first, the disagreement confirming part 140 executes processing for confirming disagreement, and only when disagreement has been confirmed, the authentication data writing part 120 writes this authentication data R into the authentication data storing part 130. On the contrary, when agreement has been confirmed at the disagreement confirming part 140, the authentication data writing part 120 does not write this authentication data R. Such an operation is useful for eliminating redundancy from data inside the authentication data storing part 130. Namely, data identical to that which has already been stored in the authentication data storing part 130 is prevented from being written again.

In practical use, the memory capacity of the IC card 100 is finite and, of course, the storage capacity of the authentication data storing part 130 is also finite. Therefore, when the IC card 100 is used for a long period of time, repeatedly inserted into a reader/writer device and repeatedly authenticated, the free space inside the authentication data storing part 130 is gradually reduced, and finally, all of the space is occupied by written authentication data R. In such a case, processing may be executed by which only the latest authentication data R is left inside the authentication data storing part 130, and other data is rewritten in order from the oldest data. For example, in a case where a plural number n of storing locations at which authentication data R can be stored have been prepared inside the authentication data storing part 130, only the last n pieces of authentication data R may be stored. Namely, until the free space is completely occupied, processing for successively writing target authentication data R into the respective storing locations is executed, and after all of the plural number n of storing locations are completely occupied, rewrite processing may be applied to a storing location at which the oldest authentication data R has been written.

Figure 3:
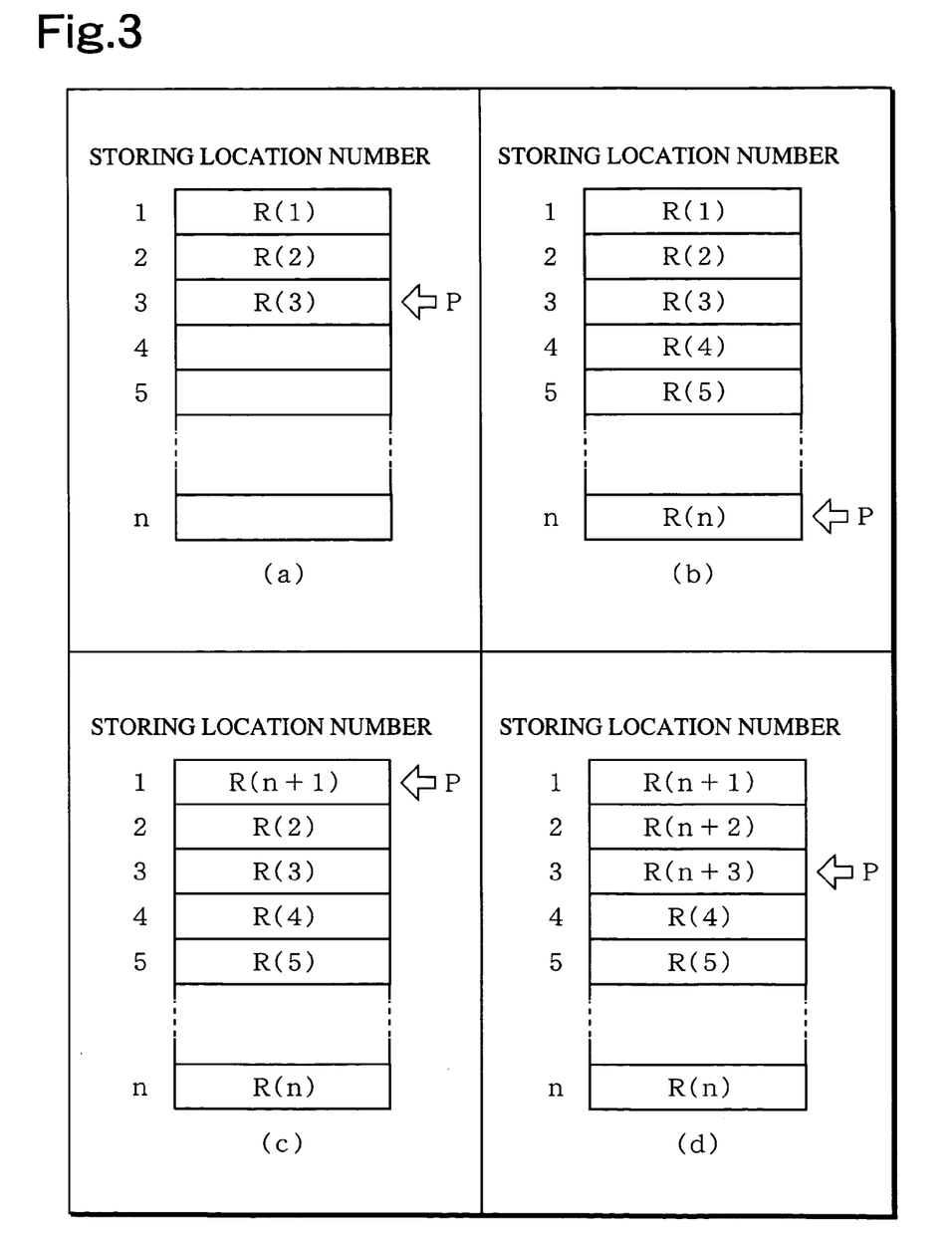
FIG. 3 illustrates diagrams showing a construction example of an authentication data storing part 130 and a storage example of authentication data inside the portable information recording medium (IC card) 100 shown in FIG. 2.

FIG. 3 illustrates diagrams showing an example of such rewrite processing. First, as shown in diagram (a), in a case where a plural number n of pieces of authentication data shown by storing location numbers 1 through 3 have been prepared, when three pieces of authentication data R(1), R(2), and R(3) are provided in order, these pieces of data are written into the storing location numbers 1, 2, and 3 in order as shown in the figure. Herein, the last written location can be shown by a pointer P. Subsequently, for example, when new authentication data R(4) has been provided, the data is written into the storing location number 4 next to the last written location shown by the pointer P, and the pointer P is updated. The diagram (b) shows a condition where all of the n pieces of authentication data R(1) through R(n) have been written after writing is thus carried out in order. In this condition, when next authentication data R(n+1) has been provided, as shown in diagram (c), the oldest authentication data R(1) at the position of the storing location number 1 may be rewritten. The diagram (d) shows a writing condition when new pieces of authentication data R(n+2) and R(n+3) have been further provided. By executing such rewrite processing, the latest n pieces of authentication data are always accumulated and stored.

Figure 4:
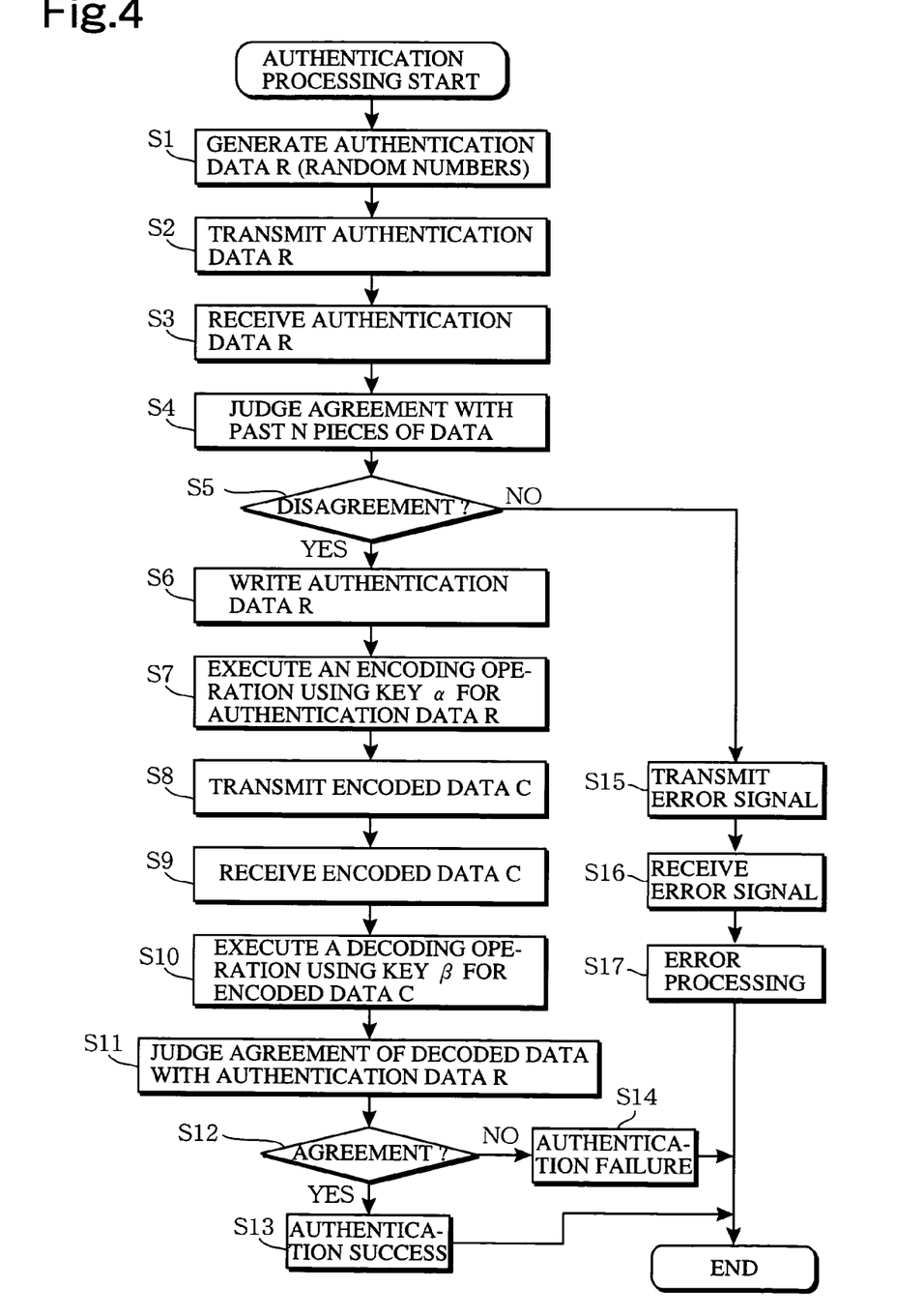
FIG. 4 is a flowchart showing basic procedures of an authentication method for a portable information recording medium relating to the invention.

FIG. 4 is a flowchart showing procedures of an authentication method for a portable information recording medium relating to the invention. Of course, when carrying out the procedures shown in FIG. 4, it is necessary in advance to prepare a portable information recording medium (IC card 100) that has a function for executing a predetermined encoding operation by using the secret key α, and it is also necessary in advance to prepare external equipment (reader/writer device 200) to access this recording medium.

When the IC card 100 is inserted into the reader/writer device 200, first, in step S1, authentication data R (random numbers) is generated at the reader/writer device 200, and in the next step S2, this authentication data R is transmitted to the IC card 100. In actuality, as mentioned above, the authentication data R is transmitted to the IC card 100 together with an authentication command. After the IC card 100 receives this authentication data R in step S3, in the next step S4, agreement of this data with past n pieces of authentication data R is judged (of course, if the number of pieces of authentication data accumulated in the authentication data storing part 130 has not reached n yet, agreement with authentication data R that has been accumulated up to this point of time may be made).

Herein, when disagreement of the new data with any of the authentication data R that has been accumulated is judged, the process proceeds from step S5 to step S6, and processing for writing this newly received authentication data R into the authentication data storing part 130 is executed. Thus, previous to authentication data writing processing of step S6, agreement judgment of step S4 is carried out, and only in the case where disagreement is judged, writing processing of step S6 is executed. This is, as mentioned above, in order to prevent redundancy of authentication data R accumulated in the authentication data storing part 130 (in order to avoid overlapped writing of identical data). Next, in step S7, an encoding operation using the secret key α is executed for this authentication data R, and encoded data C obtained by this operation is transmitted as a response in step S8.

The reader/writer device 200 receives this encoded data C transmitted as a response in step S9, and executes a decoding operation using a public key β for this encoded data C in step S10. Then, in step S11, agreement between a decoded data that has been obtained as a result of this decoding operation and the original authentication data R (random numbers generated in step S1) is judged. When they agree with each other, the process proceeds from step S12 to step S13 and the authentication results in success. On the other hand, when they do not agree with each other, the process proceeds from step S12 to S14 and the authentication results in failure.

On the other hand, as a result of agreement judgment made at the IC card 100 in step S4, when agreement with any of the pieces of authentication data R that has accumulated in the authentication data storing part 130 has been judged, the process proceeds from step S5 to step S15, and an error signal is transmitted to the reader/writer device 200 as a response. In this case, the reader/writer device 200 receives an error signal as a response in step S16, and therefore, executes predetermined error processing in the next step S17.

By carrying out authentication for the IC card 100 according to these procedures, only when it is judged in step S4 that newly provided authentication data R disagree with the past n pieces of authentication data R, an encoding operation is executed in step S7. Therefore, it becomes possible to nullify execution of an illegal analyzing method in which identical authentication data R is repeatedly provided for the IC card 100, and electric power consumption at this point is repeatedly measured, and the secret key α is statistically estimated.

The present invention has been described based on the illustrated embodiment as in the above, however, the invention is not limited to this embodiment, and the invention can be carried out in various other modes. For example, in the above-mentioned embodiment, an example in which authentication for IC card is carried out via a reader/writer device has been described, however, the present invention can be widely applied to cases where authentication for general portable information recording media is carried out from external equipment.

As described above, according to the authentication method for portable information recording media relating to the present invention, sufficient security can be secured against illegal analyzing methods.

INDUSTRIAL APPLICABILITY

The present invention provides a new method for authenticating a portable information recording medium when external equipment accesses the portable information recording medium such as an IC card. Therefore, the invention can be widely applied in fields using various portable information media. The invention is optimally used for a commercial transaction IC card for which sufficient security against illegal analyzing methods is demanded.

What is claimed is:

1. An authentication method for authenticating a portable information recording medium (100) as valid when external equipment (200) accesses said portable information recording medium, comprising:

an operation defining step for determining a first key (α), a second key (β), an encoding operation, and a decoding operation so that encoded data (C) is obtained by executing said encoding operation using said first key (α) for arbitrary authentication data (R) and data identical to said authentication data (R) is obtained by executing said decoding operation using said second key (β);

a medium preparing step in which said first key (α) is stored in the portable information recording medium (100), and a processing function for executing said encoding operation is prepared for the portable information recording medium;

a random number transmitting step (S1 and S2) in which said external equipment (200) generates a random number or numbers, and said random number or numbers are transmitted to the portable information recording medium (100) as authentication data (R);

an authentication data storing step (S6) in which said transmitted authentication data (R) is received and stored in a predetermined storing location (130) inside the portable information recording medium (100), wherein a plural number n of storing locations (130) at which authentication data (R) can be stored are prepared in the portable information recording medium (100), and only latest n pieces of authentication data (R) are stored in the authentication data storing step (S6), and applying rewrite processing to a storing location at which an oldest authentication data (R) has been written;

a judging step (S4 and S5) in which it is investigated whether or not a newly transmitted authentication data (R) agrees with previously stored authentication data (R) in the portable information recording medium (100), and only when it is determined that the newly transmitted authentication data (R) disagrees with any of the previously stored authentication data (R), it is judged that encoding is permitted;

an encoding step (S7 and S8) in which, only when encoding is permitted in said judging step, the encoding operation using the first key (α) is executed for the transmitted authentication data (R), and resulted encoded data (C) is returned to the external equipment (200);

a decoding step (S9 and S10) in which the decoding operation using the second key (β) is executed in the external equipment (200) for the encoded data (C) that has been returned from the portable information recording medium (100); and an authenticating step (S11 through S14) in which, when data identical to the authentication data (R) transmitted in said random number transmitting step is obtained as a result of said decoding operation, the portable information recording medium (100) is authenticated as valid.

2. The authentication method according to claim 1, wherein:

prior to the authentication data storing step (S6), the judging step (S4) is carried out for the authentication data (R) that has been transmitted in the random number transmitting step (S1 and S2), and only when encoding is permitted in the judging step, the authentication data storing step (S6) is carried out.

3. A portable information recording medium having a function for executing a predetermined encoding operation for authentication data (R) when the authentication data (R) has been transmitted together with an authentication command from external equipment and returning encoded data (C) resulting from the encoding operation to the external equipment as a response, comprising:

a command receiving part (110) receiving commands transmitted from said external equipment (200);

an authentication data storing part (130) storing said authentication data (R) wherein a plural number n of storing locations are prepared in the authentication data storing Part (130) so that a plural number n of pieces of authentication data (R) can be stored;

a secret key storing part (160) storing a secret key ($\alpha$) to be used for said encoding operation;

a disagreement confirming part (140) confirming disagreement between authentication data (R) that has been stored in said authentication data storing part and newly received authentication data (R) when the command receiving part (110) has received said newly received authentication data (R) together with an authentication command;

an authentication data writing part (120) writing said newly received authentication data (R) that the command receiving part (110) has received into said authentication data storing part (130), wherein the authentication data writing part (120) executes processing for writing target authentication data (R) into respective storing locations, and when all of the plural number n of storing locations are occupied, rewrite processing is applied to a storing location at which an oldest authentication data (R) has been written;

an encoding operation part (150) obtaining encoded data (C) by executing an encoding operation for said newly received authentication data (R) by using the secret key ($\alpha$) stored in the secret key storing part (160) only on condition that disagreement has been confirmed at the disagreement confirming part (140); and a response transmitting part (170) transmitting a response including said encoded data (C) to the external equipment (200).

4. The portable information recording medium according to claim 3, wherein:

writing of the newly received authentication data (R) is carried out at the authentication data writing part (120) on condition that disagreement has been confirmed by the disagreement confirming part (140).

5. The authentication method according to claim 2, wherein:

a plural number n of storing locations (130) at which authentication data (R) can be stored are prepared in the portable information recording medium (100), and only latest n pieces of authentication data (R) are stored in the authentication data storing step (S6).

6. The portable information recording medium according to claim 4, wherein:

a plural number n of storing locations are prepared in the authentication data storing part (130) so that a plural number n of pieces of authentication data (R) can be stored; and the authentication data writing part (120) executes processing for writing target authentication data (R) into respective storing locations, and when all of the plural number n of storing locations are occupied, rewrite processing is applied to a storing location at which an oldest authentication data (R) has been written.

* * * * *